US011682011B2

(12) United States Patent
Miller et al.

(10) Patent No.: US 11,682,011 B2
(45) Date of Patent: Jun. 20, 2023

(54) AUTHORIZATION PREPROCESSING SYSTEMS AND METHODS

(71) Applicant: Capital One Services, LLC, McLean, VA (US)

(72) Inventors: Walter Avery Miller, Glen Allen, VA (US); Robert A. Martin, Glen Allen, VA (US); Mark Daniel Mouadeb, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 780 days.

(21) Appl. No.: 15/948,234

(22) Filed: Apr. 9, 2018

(65) Prior Publication Data

US 2019/0311360 A1 Oct. 10, 2019

(51) Int. Cl.
*G06Q 20/40* (2012.01)
*G06N 20/00* (2019.01)
*G06Q 20/22* (2012.01)

(52) U.S. Cl.
CPC .......... *G06Q 20/401* (2013.01); *G06N 20/00* (2019.01); *G06Q 20/227* (2013.01); *G06Q 20/405* (2013.01)

(58) Field of Classification Search
CPC .................................................... G06Q 20/401
USPC .......................................................... 705/44
See application file for complete search history.

(56) References Cited

U.S. PATENT DOCUMENTS

| | | | | | |
|---|---|---|---|---|---|
| 5,644,727 | A | * | 7/1997 | Atkins | G07F 9/001 705/40 |
| 5,852,811 | A | * | 12/1998 | Atkins | G06Q 40/06 705/37 |
| 8,682,768 | B1 | * | 3/2014 | Schoen | G06Q 40/02 705/36 R |
| 2002/0069079 | A1 | * | 6/2002 | Vega | G06Q 50/188 705/80 |
| 2003/0041012 | A1 | * | 2/2003 | Grey | G06Q 30/08 705/37 |
| 2004/0199470 | A1 | * | 10/2004 | Ferry, Jr. | G06Q 20/40 705/16 |
| 2006/0242058 | A1 | * | 10/2006 | Torto | G06Q 20/02 705/44 |
| 2007/0136211 | A1 | * | 6/2007 | Brown | G06Q 20/385 705/75 |
| 2010/0145854 | A1 | * | 6/2010 | Messerges | G06Q 20/40 705/35 |
| 2012/0109821 | A1 | * | 5/2012 | Barbour | G06Q 40/02 705/44 |

(Continued)

OTHER PUBLICATIONS

European Search Report Application No. 19168287 dated Jul. 19, 2019.

*Primary Examiner* — Bruce I Ebersman
(74) *Attorney, Agent, or Firm* — DLA Piper LLP US

(57) ABSTRACT

A processor of a transaction server may receive an authorization request prior to the authorization request being processed by a payment authorization system. The processor may identify at least one alternative to the authorization request being processed by the payment authorization system. The processor may receive a command to process the authorization request by the payment authorization system or to apply the at least one alternative. The processor may process the authorization request according to the command.

10 Claims, 6 Drawing Sheets

(56) References Cited

U.S. PATENT DOCUMENTS

2014/0006276 A1* 1/2014 Grigg ................... G06Q 20/322
                                                      705/41
2014/0012743 A1* 1/2014 Hanson ................. G06Q 30/04
                                                      705/40
2014/0143144 A1   5/2014 DuCharme

* cited by examiner

US 11,682,011 B2

AUTHORIZATION PREPROCESSING SYSTEMS AND METHODS

BACKGROUND

Internet-based commerce systems and methods are widely available. In many ecommerce systems, a user may purchase goods or services by sending a transaction request to a transaction server. For example, a user of an electronic device may select a payment method (e.g., a credit card or debit card), enter payment information (e.g., a card number and/or other required information), and send the information to a server for processing. Generally, users may have multiple payment options at their disposal, but once they select a payment option and request processing, they cannot later choose a different payment option for the transaction.

SUMMARY OF THE DISCLOSURE

In one example, a system configured to process secure transactions may include a processor, a transceiver in communication with the processor, and a non-transitory memory. The memory may store instructions that, when executed by the processor, cause the processor to perform processing. The processing may include receiving, by the transceiver, an authorization request prior to the authorization request being processed by a payment authorization system. The processing may include analyzing the authorization request to identify at least one alternative to the authorization request being processed by the payment authorization system. The processing may include receiving, by the transceiver, a command to process the authorization request by the payment authorization system or to apply the at least one alternative. The processing may include processing the authorization request according to the command. Processing the authorization request may include sending the authorization request to the payment authorization system in response to receiving the command to process the authorization request by the payment authorization system and/or performing processing to apply the at least one alternative and withholding transmission of the authorization request to the payment authorization system in response to receiving the command to apply the at least one alternative.

In some embodiments, the instructions may further cause the processor to perform processing including sending, by the transceiver, a message to a client device configured to cause the client device to obtain the command. The command may be received from the client device.

In some embodiments, the instructions may further cause the processor to perform processing including storing, in the memory, a record of the processing of the authorization request according to the command.

In some embodiments, the instructions may further cause the processor to perform processing including maintaining, in the memory, the authorization request as a request in stasis until the processing of the authorization request according to the command.

In some embodiments, the authorization request may identify a payor. The analyzing may include applying a model that has been trained with a record of past financial activity of the payor. In some embodiments, the instructions may further cause the processor to perform processing including training the model.

In some embodiments, the authorization request may identify a payor. The analyzing may include selecting the at least one alternative from among a plurality of available alternatives to optimize a financial benefit to the payor.

In some embodiments, the authorization request may specify a first payment method. The at least one alternative may include a second payment method different from the first payment method.

In another example, a device configured to generate secure transaction requests may include a processor, an input device in communication with the processor, a transceiver in communication with the processor, and a non-transitory memory. The memory may store instructions that, when executed by the processor, cause the processor to perform processing. The processing may include receiving, by the input device, data describing a requested transaction. The processing may include generating an authorization request configured to cause a transaction processing system to pay for the requested transaction using a first payment method. The processing may include sending, by the transceiver, the authorization request to the transaction processing system. The processing may include receiving, by the transceiver, data describing at least one alternative payment method different from the first payment method. The processing may include selecting the first payment method or the at least one alternative payment method as a selected payment method to pay for the requested transaction. The processing may include generating a command configured to cause the transaction processing system to pay for the requested transaction using the selected payment method. The processing may include sending, by the transceiver, the command to the transaction processing system.

In some embodiments, the data describing a requested transaction may identify a payor. The at least one alternative payment method may be identified by applying a model that has been trained with a record of past financial activity of the payor.

In some embodiments, the data describing a requested transaction may identify a payor. The at least one alternative payment method may be selected from among a plurality of available alternative payment methods to optimize a financial benefit to the payor. In some embodiments, the instructions may further cause the processor to perform processing including receiving, by the input device, data describing the financial benefit to be optimized, and sending, by the transceiver, the data describing the financial benefit to be optimized to the transaction processing system.

In some embodiments, the device may further include a display in communication with the processor. The instructions may further cause the processor to perform processing including generating an alert using the data describing the at least one alternative payment method different from the first payment method, and displaying, by the display, the alert. In some embodiments, the alert may include a user-selectable option for the first payment method and a user-selectable option for the at least one alternative payment method, and the selecting may include receiving a selection of the user-selectable option for the first payment method or the user-selectable option for the at least one alternative payment method. In some embodiments, the authorization request may be configured to cause the transaction processing system to pass the authorization request to a payment authorization system. In some embodiments, the command may be configured to cause the transaction processing system to withhold transmission of the authorization request to the payment authorization system.

In another example, a secure transaction method may include receiving, by a processor of a transaction server, an authorization request prior to the authorization request being processed by a payment authorization system. The method may include storing, by the processor, the authorization request as a request in stasis in a memory of the transaction server until the processing of the authorization request according to the command. The method may include identifying, by the processor, at least one alternative to the authorization request being processed by the payment authorization system. The method may include receiving, by the processor, a command to process the authorization request by the payment authorization system or to apply the at least one alternative. The method may include processing, by the processor, the authorization request according to the command. Processing the authorization request may include sending the authorization request to the payment authorization system in response to receiving the command to process the authorization request by the payment authorization system and/or performing processing to apply the at least one alternative and withholding transmission of the authorization request to the payment authorization system in response to receiving the command to apply the at least one alternative.

In some embodiments, the processing may further include analyzing, by the processor, the authorization request to identify the at least one alternative to the authorization request being processed by the payment authorization system.

In some embodiments, the authorization request may identify a payor. The analyzing may include applying a model that has been trained with a record of past financial activity of the payor.

In some embodiments, the authorization request may identify a payor. The analyzing may include selecting the at least one alternative from among a plurality of available alternatives to optimize a financial benefit to the payor.

DETAILED DESCRIPTION OF SEVERAL EMBODIMENTS

Systems and methods described herein may provide flexible payment options to consumers by introducing unique processing systems and methods to transaction authorization systems. For example, a processing server may analyze a transaction request and determine whether other transaction options may provide benefits to the user. The server may suggest the options to the user and alter transaction processing based on the user's choice. In addition to providing consumer flexibility, the systems and methods described herein may improve backend transaction processing. For example, transaction changes after posting may require significant processing involving systems beyond the processing server (e.g., security verifications, processing by other banking systems beyond the processing bank, etc.). By introducing a transaction data category (e.g., "stasis") between a transaction authorization category and a posted transaction category, the claimed systems and methods allow the processing server to perform further processing on authorized transactions before they post, improving overall transaction efficiency and security.

Figure 1:
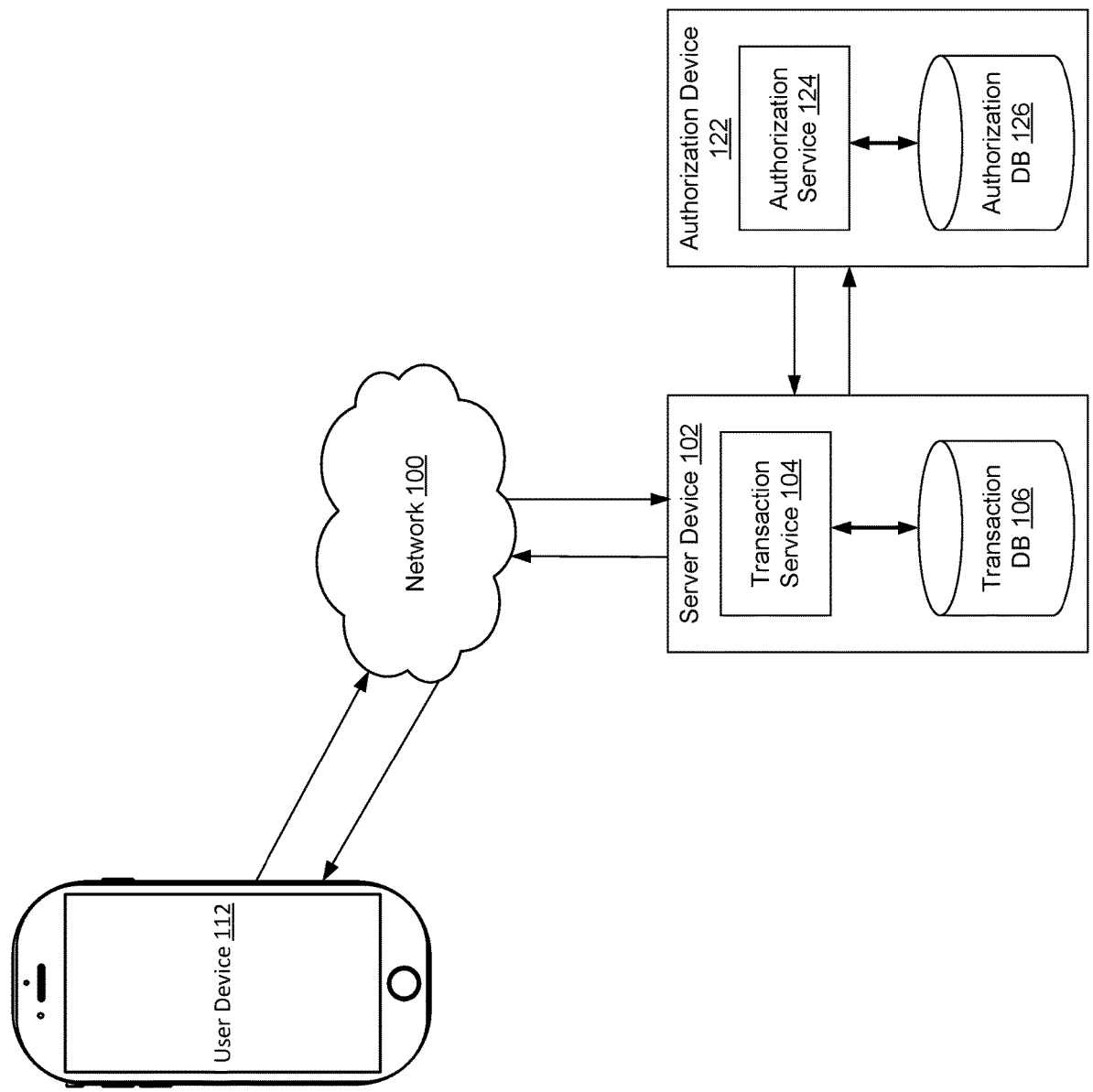
FIG. 1 shows a transaction network according to an embodiment of the present disclosure.

FIG. 1 shows a transaction network according to an embodiment of the present disclosure. A user device 112 may be used for performing or attempting to perform a transaction (e.g., purchasing something from a vendor in exchange for funds). User device 112 may be a smartphone, tablet, computer, or other device configured to request transactions. User device 112 may send transaction data to server device 102 by network 100 (e.g., the Internet or another public and/or private network). Server device 102 may be a server configured to debit, credit, and/or transfer money to and/or from an account of a user of user device 112. For example, server device 102 may be associated with a user's checking account and/or credit card account. Server device 102 may include transaction service 104, which may be configured to process transactions, and transaction database 106, which may be configured to store transaction and/or account data. Server device 102 is depicted as a single server including a single transaction service 104 and transaction database 106 for ease of illustration, but those of ordinary skill in the art will appreciate that server device 102 may be embodied in different forms for different implementations. For example, server device 102 may include a plurality of servers.

User device 112 may send transaction data to server device 102 and/or to another device (e.g., another user device 112 or other computer operated by the other party to the transaction such as a point of sale device). In the latter case, the other device may send the transaction data to server device 102. Server device 102 may use the transaction data to process the transaction. The transaction data may include data describing the transaction. For example, the transaction data may indicate the parties to the transaction and an amount (e.g., in currency) to be paid from the credit account of the payor (e.g., the owner of user device 112) to an account of the payee. The transaction data may indicate a payment method for the transaction. For example, the user may have multiple credit cards and/or bank accounts. The user may select a specific credit card or bank account from which to pay for the transaction and enter account identifying information (e.g., credit card number, expiration date, and/or security code, bank account number and/or routing number, etc.). The account identifying information may be included in the transaction data.

As described in detail below, server device 102 may process the transaction by analyzing the transaction and holding the transaction in stasis pending further information from user device 112. When processing associated with the stasis data is complete, server device 102 may communicate with authorization device 122 to post the transaction. Authorization device 122 may perform processing to fully complete the exchange of funds described in the transaction (e.g., from buyer to seller). After such processing, the transaction may be posted to the user's account, thereby debiting an amount of credit or cash value from the account. Authorization device 122 is depicted as a single server including a single authorization service 124 and authorization database 126 for ease of illustration, but those of ordinary skill in the art will appreciate that authorization device 122 may be embodied in different forms for different implementations. For example, authorization device 122 may include a plurality of servers. In another example, authorization device 122 and server device 102 may be elements of the same server system. In some embodiments, server device 102 and/or authorization device 122 may use network 100 to communicate with additional data sources (not shown), for example to obtain additional data relevant to authorization requests as described in detail below.

Figure 2:
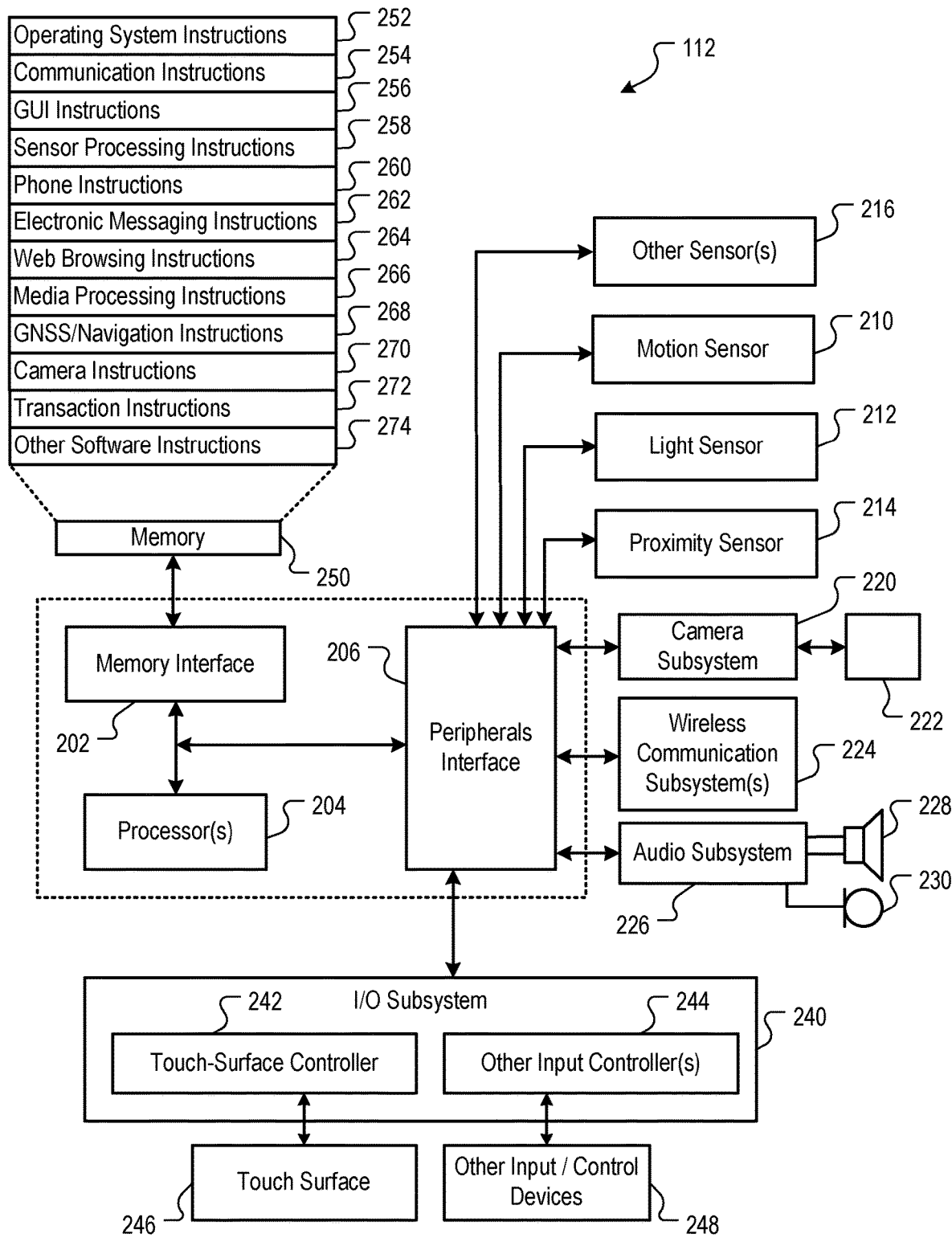
FIG. 2 shows a user device according to an embodiment of the present disclosure.

FIG. 2 shows a block diagram of an example computing device, for example a computing device configured to function as user device 112. For example, user device 112 may interact with server device 102 to process transaction requests as described herein. The user device 112 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store transaction instructions 272 to facilitate other processes and functions, such as forming transaction requests and/or communicating with server device 102 to process the transaction requests and/or process alternative transactions as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
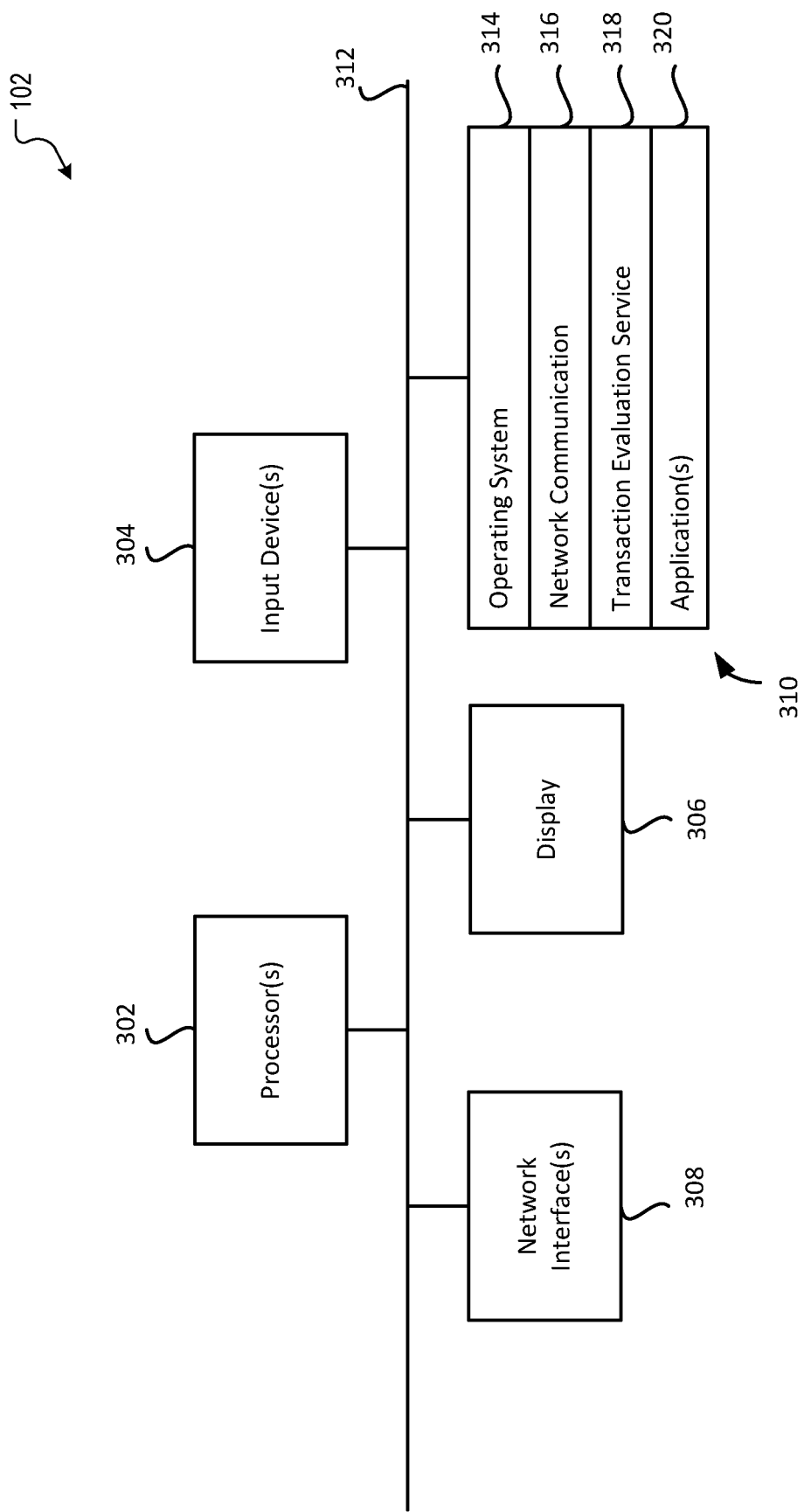
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Transaction evaluation service instructions 318 can include instructions that evaluate transaction requests as described herein. For example, evaluation service instructions 318 may evaluate transaction requests to identify possibly beneficial alternative transactions and/or process instructions from user device 112 to process transactions or alternative transactions as described herein.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
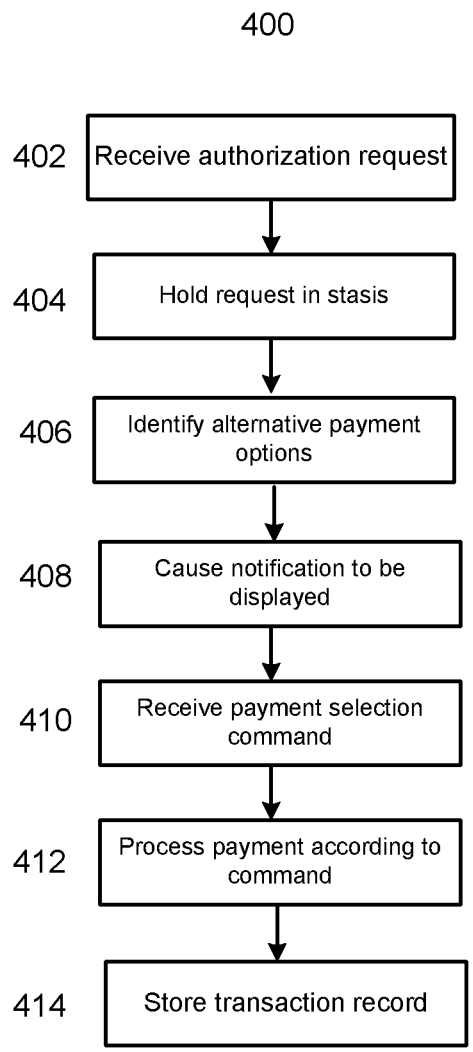
FIG. 4 shows a transaction process according to an embodiment of the present disclosure.

FIG. 4 shows a transaction process 400 according to an embodiment of the present disclosure. In some embodiments, server device 102 may perform process 400 as preprocessing of a transaction before posting the transaction.

At 402, server device 102 may receive an authorization request. For example, user device 112 may send the authorization request to server device 102 to initiate a transaction, or a third-party device (e.g., a point of sale device or ecommerce server) may send the authorization request to server device 102 to initiate a transaction. Server device 102 may receive the authorization request through network 100 or some other network, for example.

At 404, server device 102 may hold the authorization request in stasis. For example, transaction service 104 may store data from the authorization request in a stasis record in transaction database 106. Data stored may include information such as data identifying the payor, data identifying the payee, a payment amount, and/or a payment type. For example, the payment type may indicate a specific credit account or bank account from which the payment is to be drawn. Holding the authorization request in stasis may include storing authorization request data in a data category separate from "pending" and "posted" in transaction database 106. The stasis data category may be a more advanced state than "pending" (e.g., it may be approved for processing). However, the stasis data category may remain subject to modification (e.g., it may be modifiable without human intervention and special processing like a posted transaction, which may be essentially irrevocable without bank approval and special processing). This new data structure may allow server device 102 to efficiently process the transaction while giving the payor flexibility in payment type.

At 406, server device 102 may analyze the stasis record to determine whether one or more alternative payment options are available for the requested transaction. For example, the payor may have additional accounts aside from the one indicated in the authorization request. Transaction service 104 may analyze the stasis record and/or data describing the payor's accounts to determine whether any other accounts may be appropriate and/or beneficial for processing the transaction. An example process for identifying alternative payment options is described with respect to FIG. 6 below.

At 408, server device 102 may cause a notification to be displayed to the payor indicating the other accounts identified by transaction service 104. For example, server device 102 may send data causing user device 112 to display a push notification, an email, a text message, a message in a web browser (e.g., through a browser extension or chat assistant), or any other type of data. Upon receiving the data, user device 112 may notify the user that other payment options may be available for the transaction.

At 410, server device 102 may receive a command from user device 112 indicating a user selection of the original payment option from the authorization request and/or a selection of one of the alternative payment options identified by transaction service 104. Server device 102 may receive the command through network 100 or some other network, for example.

At 412, server device 102 may process the transaction according to the command. For example, the requested funds may be transferred from the selected account indicated in the command, and the transaction may post to the selected account. In some embodiments, for example when the selected payment choice is an installment payment plan, the transaction may not post entirely. For example, a first payment of the requested funds may be transferred from the selected account indicated in the command, and the first payment may post to the selected account. Additionally, data for triggering future installment payments may be stored so that the future payments may be made and posted as prescribed by the installment plan.

At 414, server device 102 may store a record of the transaction in transaction database 106. For example, transaction service 104 may change the stasis record in transaction database 106 to a posted record in transaction database 106 or may delete the stasis record in transaction database 106 and store a posted record in transaction database 106.

Figure 5:
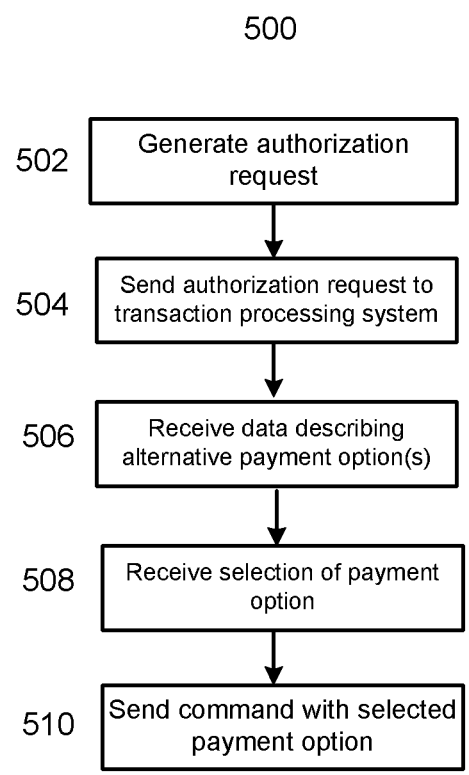
FIG. 5 shows a transaction request process according to an embodiment of the present disclosure.

FIG. 5 shows a transaction request process 500 according to an embodiment of the present disclosure. In some embodiments, user device 112 may perform process 500 to request a transaction. The following example illustration of process 500 is performed by user device 112, but where noted, some portions of process 500 may be performed by a third-party device (e.g., a point of sale device or ecommerce server).

At 502, user device 112 may generate an authorization request. For example, the authorization request may include information such as data identifying the payor, data identifying the payee, a payment amount, and/or a payment type. The payment type may indicate a specific credit account or bank account from which the payment is to be drawn. In some embodiments, this portion of process 500 may be performed by the third-party device.

At 504, user device 112 may send the authorization request to server device 102 to initiate a transaction. User device 112 may send the authorization request through network 100 or some other network, for example. In some embodiments, this portion of process 500 may be performed by the third-party device.

At 506, user device 112 may receive data describing one or more alternative payment options for the requested transaction from server device 102. For example, the payor may have additional accounts aside from the one indicated in the authorization request. Transaction service 104 may analyze the stasis record and/or data describing the payor's accounts to determine whether any other accounts may be appropriate and/or beneficial for processing the transaction. Server device 102 may send data indicating the other accounts identified by transaction service 104.

At 508, user device 112 may present the one or more alternative payment options to the user and receive a selection of a payment option. For example, user device 112 may receive data causing user device 112 to display a push notification, an email, a text message, a message in a web browser (e.g., through a browser extension or chat assistant), or any other type of data. Upon receiving the data, user device 112 may notify the user that other payment options may be available for the transaction. Notifying the user may include providing a user interface allowing the user to select the original payment option provided in the authorization request and/or one or more other payment options identified by transaction service 104. User device 112 may receive the user's selection of a payment option through the user interface.

At 510, user device 112 may send a command to server device 102 indicating the user selection of the original payment option from the authorization request and/or the selection of one of the alternative payment options received through the user interface. User device 112 may send the command through network 100 or some other network, for example.

Figure 6:
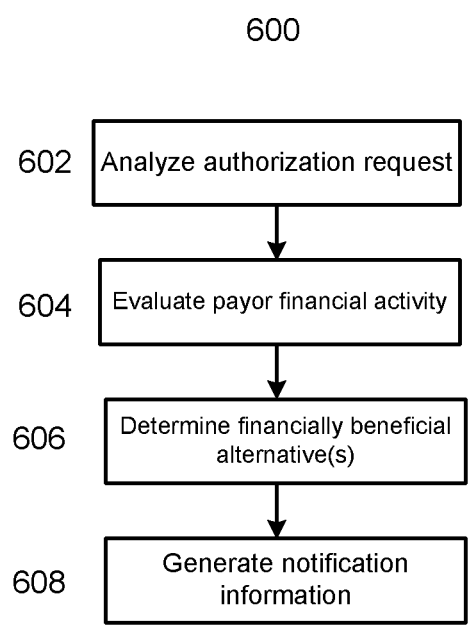
FIG. 6 shows a transaction evaluation process according to an embodiment of the present disclosure.

FIG. 6 shows a transaction evaluation process 600 according to an embodiment of the present disclosure. In some embodiments, server device 102 may perform process 600 to determine whether one or more alternative payment options are available for a requested transaction (e.g., at 406 of process 400 above).

At 602, server device 102 may analyze the authorization request to determine the payment details of the request. The details may include information such as data identifying the payor, data identifying the payee, a payment amount, and/or a payment type. For example, the payment type may indicate a specific credit account or bank account from which the payment is to be drawn. Based on this analysis, transaction service 104 may be able to compare the request parameters to alternatives in further processing under process 600. In some embodiments, transaction service 104 may gather further information relevant to the authorization request but not necessarily contained within the authorization request as part of the analysis. For example, transaction service 104 may gather data such as an account balance for the account from which payment is requested to be drawn, an annual percentage rate (APR) associated with the account (e.g., for interest on a credit card balance), and/or customer preference settings for optimization (e.g., user preferences as described below). This data may be available in transaction database 106 and/or through sources outside server device 102 (e.g., national shared databases of deposit account information).

At 604, server device 102 may evaluate payor financial activity to determine what payment characteristics may be optimized. For example, server device 102 may have received user input describing user preferences (e.g., as part of an account setup and/or through a user interface at user device 112) and stored the input in transaction database 106. Transaction service 104 may access the stored input and/or may build at least one optimization model based on the stored input and store the optimization model in transaction database 106. For example, the stored input may specify that the user prefers optimizing account interest collection, that the user prefers optimizing for credit card benefits, that the user prefers not to incur debt, and/or some other preference. Transaction service 104 may generate a model using the stored input and data about the user's previously observed financial activity. For example, based on the user's payment cycles, payment history, deposit cycles, average daily balance, credit score, and/or other account information, transaction service 104 may model effects of different payment choices on the user's account(s).

At 606, server device 102 may determine whether any beneficial payment alternatives to the requested payment method exist. For example, transaction service 104 may search for specific available offers to present as alternatives (e.g., a credit card the payor does not have may have a signup bonus for the transaction the payor is attempting, so transaction service 104 may suggest obtaining and paying with that credit card). Transaction service 104 may also or alternatively use the user input and/or models to identify alternatives. For example, assume the payor has indicated they like maximizing credit card points in the user input. Transaction service 104 may identify an alternative credit card to the credit card in the transaction request, because the alternative credit card may earn more points on the requested transaction than the credit card in the request. In another example, assume the payor has indicated they like maximizing interest in an interest-bearing checking account in the user input. Transaction service 104 may suggest an installment payment plan drawing from the checking account instead of a one-time draw from the checking account as indicated in the transaction request, because the money may earn interest while remaining in the checking account before being paid out in an installment. In this example, transaction service 104 may use the payment cycle and deposit cycle information to ensure the user is likely to have money in the checking account when installments are due. Transaction service 104 may also access external data sources such as national shared account databases to find offers and/or alternatives that may be attractive to the payor. For example, transaction service 104 may identify a public offer of financing provided by the payee. Transaction service 104 may determine that the public offer is a potential alternative to offer to the payor.

At 608, server device 102 may generate notification information. For example, transaction service 104 may generate data causing user device 112 to display a push notification, an email, a text message, a message in a web browser (e.g., through a browser extension or chat assistant), or any other type of data. As described above, server device 102 may send this data to user device 112 (e.g., at 408 of process 400).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system configured to process secure transactions, the system comprising:
   a processor;
   a transceiver in communication with the processor; and
   a non-transitory memory storing instructions that, when executed by the processor, cause the processor to perform processing comprising:
      training a model that optimizes for a preference identified from input by a payor and that has been trained with a record of past financial activity of the payor;
      receiving, by the transceiver, an authorization request prior to the authorization request being processed by a payment authorization system, the authorization request identifying the payor;
      analyzing the authorization request to identify at least one alternative to the authorization request being processed by the payment authorization system, the analyzing comprising applying the trained model;
      receiving, by the transceiver, a command to apply the at least one alternative;
      maintaining, in the memory, the authorization request as a request in stasis until the processing of the authorization request according to the command, wherein the request in stasis is recorded as being approved by a transaction service for the processing and remains modifiable in the memory; and
      processing the authorization request according to the command, the processing comprising:
         withholding transmission of the authorization request to the payment authorization system in response to receiving the command to apply the at least one alternative;
         performing processing to apply the at least one alternative, the processing comprising generating a plurality of second payment authorization requests, each being for a separate one of a plurality of installment payments that sum to a total value of the payment authorization request, transmitting one of the second payment authorization requests to the payment authorization system, and scheduling future transmissions of the remaining ones of the second payment authorization requests;
         during the withholding, modifying the request in stasis according to the at least one alternative; and
         storing the modified request in stasis at the payment authorization system.

2. The system of claim 1, wherein:
   the instructions further cause the processor to perform processing comprising sending, by the transceiver, a message to a client device configured to cause the client device to obtain the command; and
   the command is received from the client device.

3. The system of claim 1, wherein the instructions further cause the processor to perform processing comprising storing, in the memory, a record of the processing of the authorization request according to the command.

4. The system of claim 1, wherein:
   the authorization request identifies a payor; and
   the analyzing comprises selecting the at least one alternative from among a plurality of available alternatives to optimize a financial benefit to the payor.

5. The system of claim 1, wherein:
   the authorization request specifies a first payment method; and
   the at least one alternative comprises a second payment method different from the first payment method.

6. A method of processing secure transactions, the method comprising:
   training, by a processor, a model that optimizes for a preference identified from input by a payor and that has been trained with a record of past financial activity of the payor;
   receiving, by a transceiver in communication with the processor, an authorization request prior to the authorization request being processed by a payment authorization system, the authorization request identifying the payor;
   analyzing, by the processor, the authorization request to identify at least one alternative to the authorization request being processed by the payment authorization system, the analyzing comprising applying the trained model;
   receiving, by the transceiver, a command to apply the at least one alternative;
   maintaining, by the processor in a memory in communication with the processor, the authorization request as a request in stasis until the processing of the authorization request according to the command, wherein the request in stasis is recorded as being approved by a transaction service for the processing and remains modifiable in the memory; and
   processing, by the processor, the authorization request according to the command, the processing comprising:
      withholding transmission of the authorization request to the payment authorization system in response to receiving the command to apply the at least one alternative;
      performing processing to apply the at least one alternative, the processing comprising generating a plurality of second payment authorization requests, each being for a separate one of a plurality of installment payments that sum to a total value of the payment authorization request, transmitting one of the second payment authorization requests to the payment authorization system, and scheduling future transmissions of the remaining ones of the second payment authorization requests;
      during the withholding, modifying the request in stasis according to the at least one alternative; and
      storing the modified request in stasis at the payment authorization system.

7. The method of claim 6, further comprising:
   sending, by the transceiver, a message to a client device configured to cause the client device to obtain the command; and
   the command is received from the client device.

8. The method of claim 6, further comprising storing, by the processor in the memory, a record of the processing of the authorization request according to the command.

9. The method of claim 6, wherein:
   the authorization request identifies a payor; and
   the analyzing comprises selecting the at least one alternative from among a plurality of available alternatives to optimize a financial benefit to the payor.

10. The method of claim 6, wherein:
the authorization request specifies a first payment method; and
the at least one alternative comprises a second payment method different from the first payment method.

\* \* \* \* \*